United States Patent [19]

Tsubouchi

[11] Patent Number: 4,587,884
[45] Date of Patent: May 13, 1986

[54] TANDEM BRAKE BOOSTER FOR AUTOMOTIVE VEHICLE

[75] Inventor: Kaoru Tsubouchi, Toyota, Japan

[73] Assignee: Aisin Seiki Kabushiki Kaisha, Kariya, Japan

[21] Appl. No.: 697,442

[22] Filed: Feb. 1, 1985

[30] Foreign Application Priority Data

Feb. 2, 1984 [JP] Japan ............................. 59-13925[U]

[51] Int. Cl.$^4$ .......................... F15B 9/10; F01B 19/00
[52] U.S. Cl. .............................. 91/369 A; 91/376 R; 92/48; 92/97
[58] Field of Search ..................... 92/48, 64, 99; 91/369 A, 376 R, 97; 60/547.1; 403/288

[56] References Cited

U.S. PATENT DOCUMENTS 3,613,506 10/1971 Kytta ........................... 91/369 A
4,512,237 4/1985 Endoh et al. .................. 92/48 X
4,516,474 5/1985 Ochiai ........................... 92/48 X

*Primary Examiner*—Robert E. Garrett
*Assistant Examiner*—Mark A. Williamson
*Attorney, Agent, or Firm*—Oblon, Fisher, Spivak, McClelland & Maier

[57] ABSTRACT

A tandem brake booster for automotive vehicles comprises a housing the interior of which is subdivided into front and rear chambers by means of a partition wall, a front movable wall assembled within the front chamber to subdivide the front chamber into front constant and variable pressure chambers and being integrally provided at its inner peripheral portion with a front cylindrical hub member extending from the front chamber into the rear chamber across the partition wall, a rear movable wall assembled within the rear chamber to subdivide the rear chamber into rear constant and variable pressure chambers and being integrally provided at its inner peripheral portion with a rear hub member. The rear hub member is engaged with the rear end of the front hub member and is formed with a cylindrical portion which extends into the front variable pressure chamber across the partition wall and is arranged in surrounding relationship with the front cylindrical hub member. A cylindrical seal member is disposed between the front cylindrical hub member and the cylindrical portion of the rear hub member to connect the front and rear movable walls to each other and is formed in its peripheral wall with a first recess for providing a passage for communication between the constant pressure chambers and with a second recess for providing a passage for communication between the constant pressure chambers.

6 Claims, 6 Drawing Figures

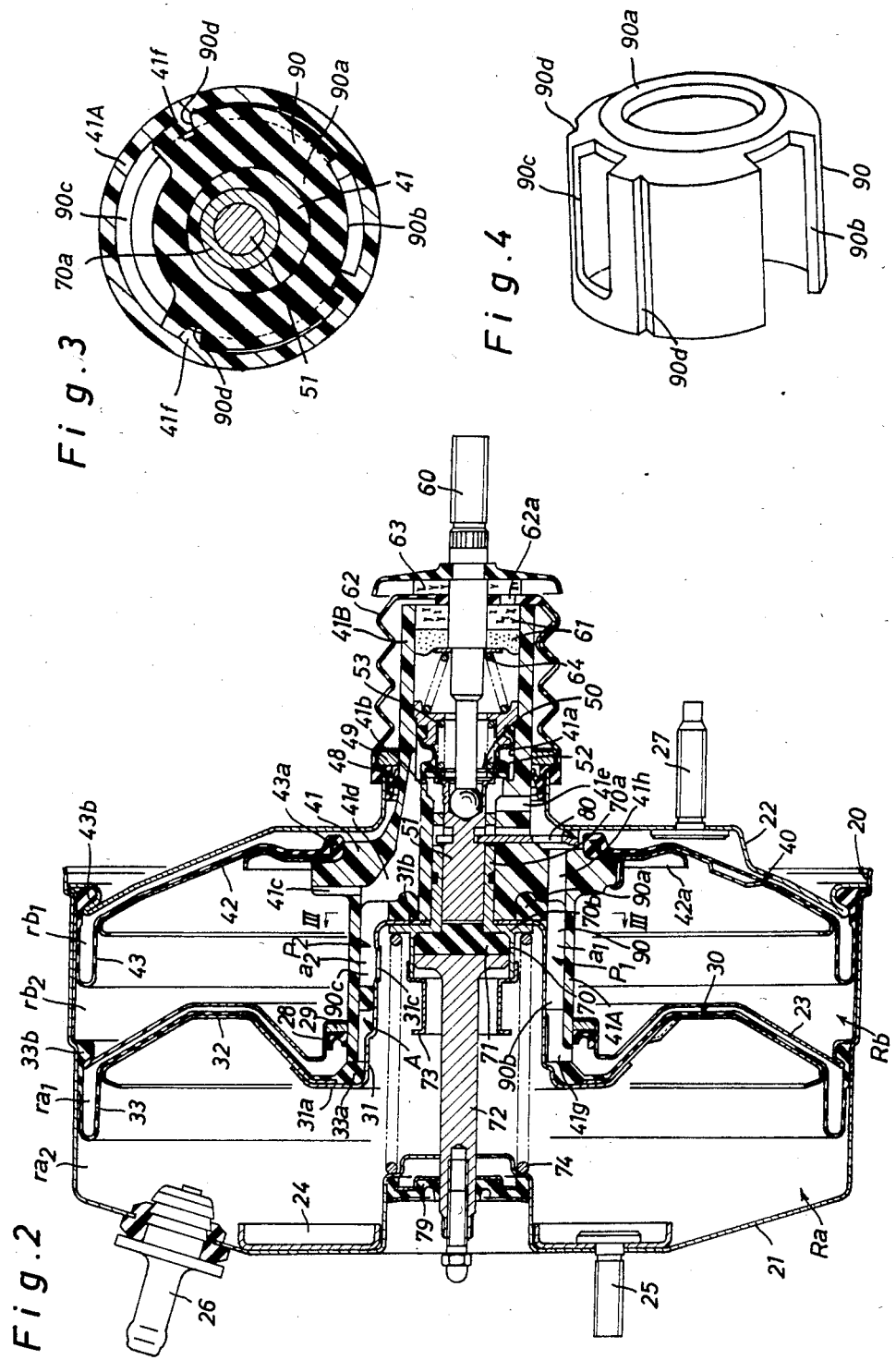

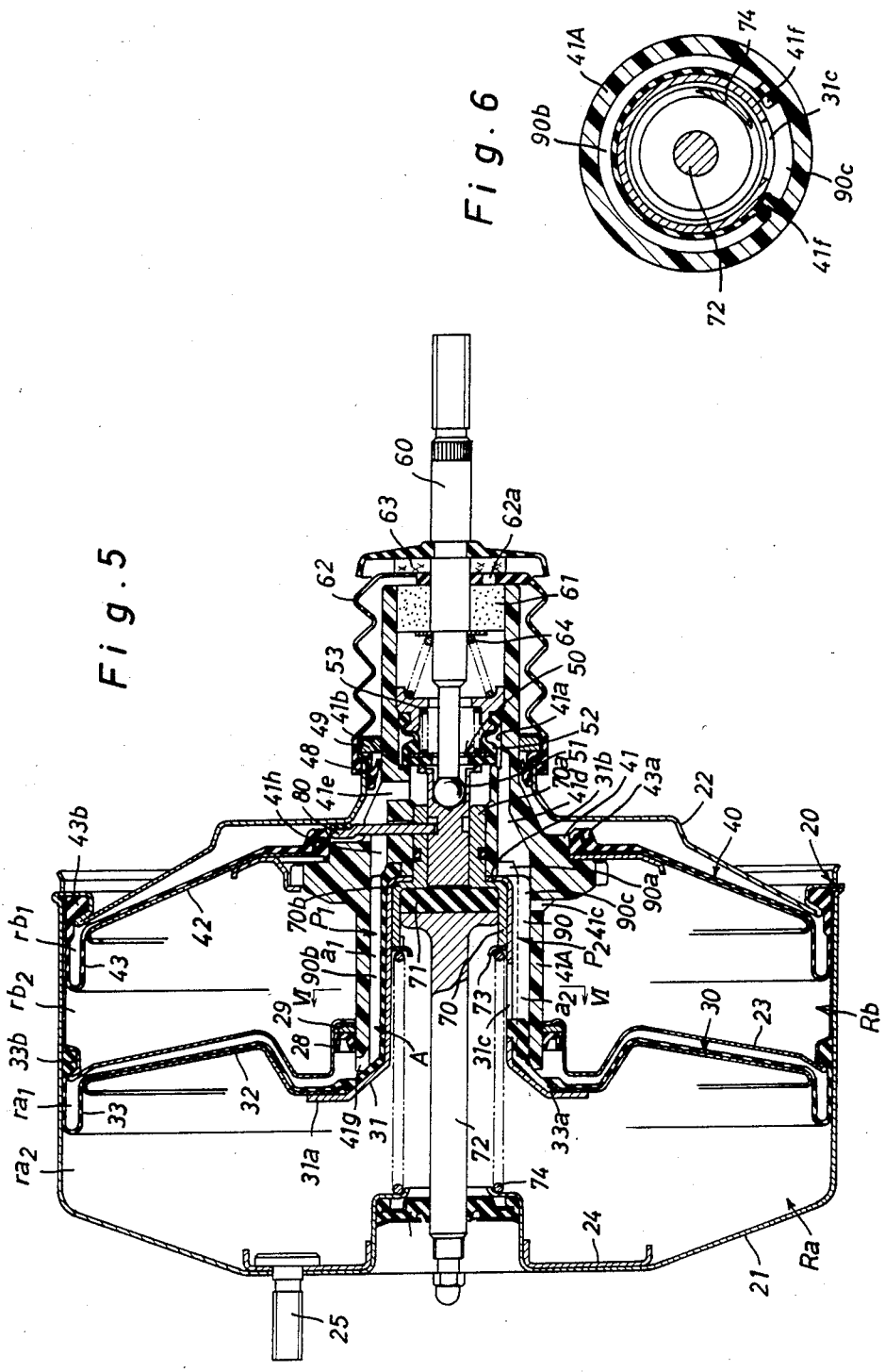

TANDEM BRAKE BOOSTER FOR AUTOMOTIVE VEHICLE

BACKGROUND OF THE INVENTION

The present invention relates to a brake booster for automotive vehicles, and more particularly to a tandem brake booster the housing of which is subdivided into front and rear chambers by means of a partition wall assembled therein and in which front and rear movable walls are respectively assembled within the front and rear chambers and connected to each other through the partition wall, the front chamber being subdivided by the front movable wall into first constant and variable pressure chambers, and the rear chamber being subdivided by the rear movable wall into second constant and variable pressure chambers.

In such a conventional tandem brake booster as described above, a first passage for communication between the first and second constant pressure chambers is formed in the peripheral wall of the housing, and a second passage for communication between the first and second variable pressure chambers is also formed in the peripheral wall of the housing. In such an arrangement of the first and second communication passages, the construction of the brake booster becomes large in size, and the responsibility in operation of the brake booster is inevitably influenced by the length of the passages. To solve the problems, an improved tandem brake booster has been proposed in an Early Publication of the Japanese Utility Model Application No. 58-106265, as is illustrated in FIG. 1. In the improved tandem brake booster, a first passage 3 for communication between first and second variable pressure chambers 1 and 2 is formed by an axial passage 5a in a hub member 5 of the front movable wall 4 and an axial hole 7a in a hub member 7 of the rear movable wall 6, while a second passage 10 for communication between first and second constant pressure chambers 8 and 9 is formed by a radial hole 11a of an inner cylindrical case 11 coupled within the front hub member 5 and axial and radial holes 5b, 5c in the front hub member 5. In this arrangement, however, the inner cylindrical case 11 is coupled within the front and rear hub members 5 and 7 and fastened to them by means of a clip 16 fixed to its rear end and a nut 17 fixed to its front end. Such an assembly process of the inner cylindrical case 17 is complicated, resulting in decrease of the productivity of the brake booster.

SUMMARY OF THE INVENTION

It is, therefore, a primary object of the present invention to provide an improved tandem brake booster wherein the first and second communication passages are formed in a simple construction and wherein the front and rear movable walls are connected to each other in a simple manner to enhance the productivity of the brake booster.

According to the present invention, there is provided a tandem brake booster for automotive vehicles which comprises a housing the interior of which is subdivided into front and rear chambers by means of a partition wall member assembled therein, front and rear movable walls respectively assembled within the front and rear chambers and arranged to be connected to each other through said partition wall, the front movable wall subdividing the front chamber into first constant and variable pressure chambers, and the rear movable wall subdividing the rear chamber into second constant and variable pressure chambers, a front cylindrical hub member secured at its front end to the inner peripheral portion of the front movable wall and extending from the first constant pressure chamber into the second constant pressure chamber across the partition wall member, a rear hub member secured to the inner peripheral portion of the rear movable wall coaxially with the front cylindrical hub member and being engaged with the rear end of the front cylindrical hub member, the rear hub member being formed with a cylindrical portion which extends into the first variable pressure chamber across the partition wall member and is arranged in surrounding relationship with the front cylindrical hub member, the cylindrical portion of the rear hub member being axially slidably supported by the partition wall in an air-tight manner, a cylindrical seal member disposed between the front cylindrical hub member and the cylindrical portion of the rear hub member to connect the front and rear movable walls to each other, the cylindrical seal member being formed in its peripheral wall with a first recess for providing a passage for communication between the constant pressure chambers and with a second recess for providing a passage for communication between the variable pressure chambers, and valve means assembled within the rear hub member for interrupting a communication of the second variable pressure chamber with the atmospheric air in a released condition of the brake booster and for establishing the communication of the second variable pressure chamber with the atmospheric air in operation of the brake booster.

BRIEF DESCRIPTION OF THE DRAWINGS

Additional objects and advantages of the present invention will become more apparent from the following detailed description of preferred embodiments thereof when considered with reference to the attached drawings, in which:

FIG. 2 is a sectional view of a tandem brake booster in accordance with the present invention;

FIG. 3 is a cross-sectional view taken along line III—III in FIG. 2;

FIG. 4 is a perspective view of a cylindrical seal member assembly within the brake booster of FIG. 2;

FIG. 5 is a sectional view of another embodiment of the tandem brake booster shown in FIG. 2; and FIG. 6 is a cross-sectional view taken along line VI—VI in FIG. 5.

DETAILED DESCRIPTION OF THE PREFERRED EMBODIMENTS

Figure 1:
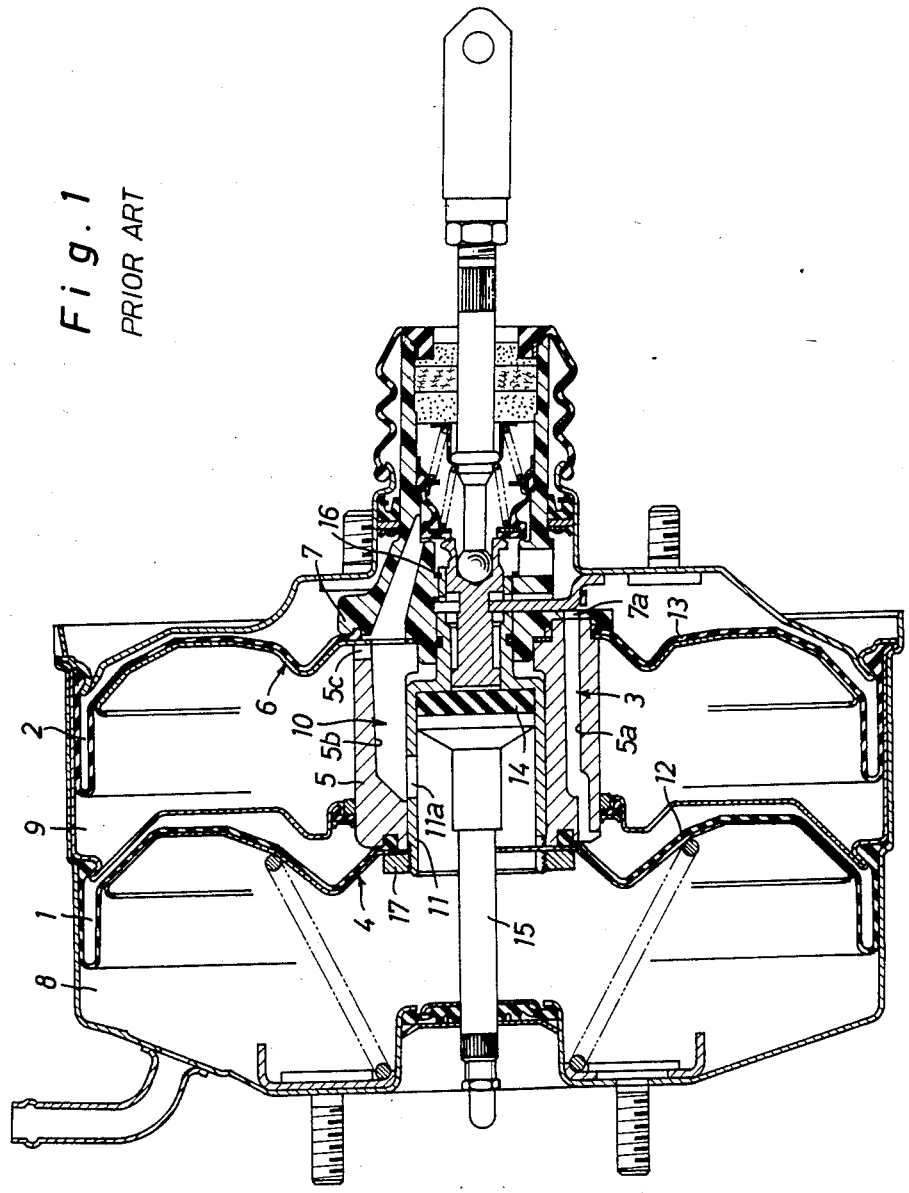
FIG. 1 is a sectional view of the conventional tandem brake booster described above.

Referring now to the drawings, particularly in FIG. 2, there is illustrated a preferred embodiment of a tandem brake booster in accordance with the present invention. A housing assembly 20 for the brake booster includes front and rear housing shells 21 and 22 coupled at their opposed ends with each other in an air-tight manner. The interior of housing assembly 20 is subdivided into front and rear chambers Ra and Rb by means of a partition wall member 23 which is hermetically coupled at its outer cylindrical portion with the inner wall of front housing shell 21. A pair of front and rear movable walls 30 and 40 are respectively assembled within the front and rear chambers Ra and Rb, and an annular reinforcement plate 24 is secured to the inner wall of front housing shell 21, to which a plurality of bolts 25 are fastened for connection to a master cylinder (not shown). A connector 26 is mounted in an air-tight manner on the front upper portion of housing shell 21 for connection to an intake manifold (not shown). The rear housing shell 22 is provided with a plurality of bolts 27 fixed thereto for mounting the brake booster on a vehicle body structure (not shown).

The front movable wall 30 is composed of a cylindrical hub member 31, an annular support plate 32 and a diaphragm member 33, which movable wall 30 subdivides the interior of front chamber Ra into a variable pressure chamber $ra_1$ and a constant pressure chamber $ra_2$. The cylindrical hub member 31 is formed at its front end with an annular flange 31a and at its rear end with an annular bottom flange 31b, which hub member 31 extends into the rear chamber Rb across the partition wall member 23 and is engaged at its annular bottom flange 31b with a hub member 41 of rear movable wall 40. The annular support plate 32 is welded at its inner peripheral portion to the annular flange 31a of hub member 31. The diaphragm member 33 is attached to the rear face of annular support plate 32 and has an inner peripheral thick rim 33a coupled over an annular shoulder of hub member 31 and an outer peripheral thick rim 33b fixed to the inner wall of front housing shell 21 by means of an annular shoulder of partition wall member 23.

The rear movable wall 40 is composed of the hub member 41, an annular support plate 42 and a diaphragm member 43, which rear movable wall 40 subdivides the interior of rear chamber Rb into a variable pressure chamber $rb_1$ and a constant pressure chamber $rb_2$. As will be described in detail later, the variable pressure chamber $rb_1$ is in communication with the front variable pressure chamber $ra_1$ through a first passage $P_1$, while the constant pressure chamber $rb_2$ is in communication with the front constant pressure chamber $ra_2$ through a second passage $P_2$. The hub member 41 is made of synthetic resin and formed with a cylindrical portion 41B which extends outwardly from the rear housing shell 22 through an annular seal member 48 and an annular bush 49. The cylindrical portion 41B of hub member 41 is provided therein with a valve means 50 for establishing a communication between the variable pressure chamber $rb_1$ and the constant pressure chambers $ra_2$, $rb_2$ in a released condition of the brake booster and for establishing a communication of the variable pressure chamber $rb_1$ with the atmospheric air in operation of the brake booster. The annular support plate 42 is formed at its inner peripheral portion with an annular flange engaged within an inner peripheral thick rim 43a of diaphragm member 43 and coupled over an annular shoulder of hub member 41. An annular retainer member 42a is welded to the inner peripheral portion of support plate 42 and fastened to the hub member 41 to retain the support plate 42 in place. The diaphragm member 43 is attached to the rear face of support plate 42 and has an outer peripheral thick rim 43b fixed to the cylindrical portion of partition wall member 23 by means of an outer peripheral rim of rear housing shell 22.

The valve means 50 includes a valve plunger 51 which is axially slidably disposed within an inner case 70 and connected to the inner end of a push rod 60 to be moved by depression of a brake pedal (not shown). A key member 80 is assembled with the hub member 41 to retain the valve plunger 51 in position. The valve means 50 further includes a cylindrical valve member 52 of elastomeric material which is assembled within an axial bore 41a of hub member 41 and loaded by a coil spring 53 toward the rear end of valve plunger 51. The cylindrical valve member 52 is selectively engaged with the rear end of valve plunger 51 or an annular shoulder 41b in hub member 41 in response to axial movement of the push rod 60. When the cylindrical valve member 52 is in engagement with the rear end of valve plunger 51 and apart from the annular shoulder 41b in hub member 41 in a released condition of the brake booster, the constant pressure chamber $rb_2$ communicates with the variable pressure chamber $rb_1$ via passages 41c, 41d, the axial bore 41a and a radial passage 41e. When the cylindrical valve member 52 is in engagement with the annular shoulder 41b and apart from the rear end of valve plunger 51 in operation of the brake booster, the variable pressure chamber $rb_1$ communicates with the atmospheric air via the passage 41e, the axial bore 41a in hub member 41, the axial bore in valve member 52, an inner air filter 61, a vent hole 62a of a boot 62 and an outer air filter 63. In the released condition of the brake booster, the key member 80 is in abutment with the inner wall of rear housing shell 22 to retain the hub member 41 and valve plunger 51 in their released positions. Thus, the cylindrical valve member 52 is reliably engaged with the rear end of valve plunger 51 so that the variable pressure chamber $rb_1$ is immediately connected to the atmospheric air in response to axial movement of the push rod 60 against a spring 64.

The inner case 70 is in the form of a stepped cylindrical member which is formed with a sleeve portion 70a and an annular flange 70b. The sleeve portion 70a of case 70 is coupled within hub member 41 in an air-tight manner and retained by engagement with the key member 80. The inner case 70 is engaged at its annular flange 70b with the annular bottom flange 31b of cylindrical hub member 31 and contains therein the valve plunger 51 and a rubber cushion disc 71. The rubber cushion disc 71 receives thereon the rear end of an operation rod 72 which extends outwardly from the front housing shell 21 through a seal member 79 to be engaged with a piston in the master cylinder. Furthermore, a cylindrical retainer 73 is fixedly coupled over the front end of inner case 70, and a compression coil spring 74 is engaged at its one end with the inner wall of front housing shell 21 and at its other end with the annular flange 70b of inner case 70 to bias the hub member assembly rearwardly.

In the brake booster assembly, the rear hub member 41 is further formed at its front end with a cylindrical portion 41A which extends into the front variable pressure chamber $ra_1$ across the partition member 23. The cylindrical portion 41A of rear hub member 41 is slidably supported by an annular seal member 28 and an annular bush 29 fixed to the inner peripheral rim of partition wall member 23 and is in abutment with the inner peripheral thick rim 33a of diaphragm member 33. The cylindrical portion 41A of rear hub member 41 is in surrounding relationship with the front hub member 31 to form a cylindrical space A in which a cylindrical seal member 90 of rubber is assembled. As shown in FIGS. 2-4, the cylindrical seal member 90 is formed at its rear end with an annular bottom flange 90a and in its peripheral wall with first and second axial recesses 90b and 90c. The first axial recess 90b extends between the front and rear ends of cylindrical seal member 90, and the second axial recess 90c extends from an intermediate portion of seal member 90 to the rear end of the same. The cylindrical seal member 90 is further formed in its peripheral wall with circumferentially spaced axial grooves 90d, and the cylindrical portion 41A of rear hub member 41 is formed at its inner wall with circumferentially spaced axial ribs 41f which are engaged with the axial grooves 90d to retain the cylindrical seal member in position. When disposed within the cylindrical space A, the cylindrical seal member 90 is engaged in an air-tight manner at its outer and inner peripheries with the cylindrical portion 41A of rear hub member 41 and the front hub member 31.

In such an arrangement of the cylindrical seal member 90, an axial space $a_1$ is formed by the first recess 90b, and an axial space $a_2$ is formed by the second recess 90c. To provide the first communication passage $P_1$ between the front and rear variable pressure chambers $ra_1$ and $rb_1$, the cylindrical portion 41A of rear hub member 41 is formed at its front end with a radial recess 41g through which the axial space $a_1$ communicates into the front variable pressure chamber $ra_1$. On the other hand, the rear hub member 41 is formed therein with an axial passage 41h through which the axial space $a_1$ communicates into the rear variable pressure chamber $rb_1$. To provide the second communication passage $P_2$ between the front and rear constant pressure chambers $ra_2$ and $rb_2$, the front hub member 31 is formed in its peripheral wall with a radial hole 31c through which the axial space $a_2$ communicates into the front constant pressure chamber $ra_2$. On the other hand, the rear hub member 41 is formed therein with a radial hole 41c and an axial hole 41d through which the axial space $a_2$ communicates into the rear constant pressure chamber $rb_2$.

As is understood from the above description, the construction of the brake booster is characterized in that both the communication passages $P_1$ and $P_2$ are formed by the cylindrical seal member 90 disposed between the cylindrical hub member 31 and the cylindrical portion 41A of rear hub member 41. This serves to simplify the construction of the brake booster so as to enhance the productivity thereof. During the assembly process of the brake booster, the front and rear movable walls 30 and 40 can be connected to each other in such a simple manner that the cylindrical seal member 90 is coupled over the cylindrical hub member 31 and inserted into the cylindrical portion 41A of rear hub member 41 to form the communication passages $P_1$ and $P_2$. In operation of the brake booster, a forward force acting on the front movable wall 30 is applied to the inner case 70 through the annular bottom flange 31b of front hub member 31 and then applied to the operation rod 72 through the rubber cushion disc 71. Additionally, a forward force acting on the rear movable wall 40 is applied to the operation rod 72 through the rear hub member 41 and the annular bottom flange 31b of front hub member 31.

In FIG. 5, there is illustrated another embodiment of the brake booster, wherein the cylindircal seal member 90 is formed integrally with the inner peripheral thick rim 33a of diaphragm member 33, and wherein the cylindrical retainer is replaced with an annular retainer 73 engaged with the inner case 70 to receive thereon the one end of compression coil spring 74. Other construction and component parts are substantially the same as those in the above-described embodiment.

Although the present invention has been illustrated and described in connection with specific embodiments, various adaptations and modifications will becomes apparent to those skilled in the art from the description in conjunction with the appended claims without departing from the scope and spirit of the present invention.

What is claimed is:

1. A tandem brake booster for automotive vehicles comprising:
   a housing the interior of which is subivided into front and rear chambers by means of a partition wall member assembled therein;
   front and rear movable walls respectively assembled within the front and rear chambers and arranged to be connected to each other through said partition wall member, said front movable wall subdividing the front chamber into first constant and variable pressure chambers, and said rear movable wall subdividing the rear chamber into second constant and variable pressure chambers;
   a front cylindrical hub member secured at its front end to the inner peripheral portion of said front movable wall and extending from the first constant pressure chamber into the second constant pressure chamber across said partition wall member;
   a rear hub member secured to the inner peripheral portion of said rear movable wall coaxially with said front cylindrical hub member and being engaged with the rear end of said front cylindrical hub member, said rear hub member being formed with a cylindrical portion which extends into the first variable pressure chamber across said partition wall member and is arranged in surrounding relationship with said front cylindrical hub member, the cylindrical portion of said rear hub member being axially slidably supported by said partition wall in an air-tight manner;
   a cylindrical seal member disposed between said front cylindrical hub member and the cylindrical portion of said rear hub member, said cylindrical seal member being formed in its peripheral wall with a first recess for providing a first passage for commmunication between the first and second constant pressure chambers and with a second recess for providing a second passage for communication between the first and second variable pressure chambers; and
   valve means assembled within said rear hub member for interrupting a communication of the second variable pressure chamber with the atmospheric air in a released condition of said brake booster and for establishing the communication of the second variable pressure chamber with the atmospheric air in operation of said brake booster.

2. A tandem brake booster as claimed in claim 1, wherein said cylindrical seal member is integrally formed with the inner peripheral portion of said front movable wall.

3. A tandem brake booster as claimed in claim 1, wherein said cylindrical seal member is formed at its rear end with an annular bottom flange engaged with said rear hub member, and said front cylindrical hub member is formed at its rear end with an annular bottom flange engaged with the annular bottom flange of said cylindrical seal member.

4. A tandem brake booster as claimed in claim 1, wherein said cylindrical seal member is formed in its peripheral wall with an axial groove, and the cylindrical portion of said rear hub member is formed at its inner wall with an axial rib engaged with the axial groove of said cylindrical seal member.

5. A tandem brake booster as claimed in claim 1, wherein the cylindrical portion of said rear hub member is engaged with the inner peripheral portion of said front movable wall.

6. A tandem brake booster as claimed in claim 1, wherein said cylindrical seal member is arranged to connect said front and rear movable walls to each other.

* * * * *